(12) United States Patent
Hatchiguian

(10) Patent No.: US 6,315,411 B1
(45) Date of Patent: Nov. 13, 2001

(54) EYESIGHT PROTECTIVE COMPOSITE GLASS

(75) Inventor: Joseph Hatchiguian, Saint Germain en Laye (FR)

(73) Assignee: Sporoptic Pouilloux, Paris (FR)

( * ) Notice: Subject to any disclaimer, the term of this patent is extended or adjusted under 35 U.S.C. 154(b) by 0 days.

(21) Appl. No.: 09/693,953

(22) Filed: Oct. 23, 2000

(30) Foreign Application Priority Data

Oct. 21, 1999 (FR) .................................................. 99 13151

(51) Int. Cl.[7] ................................. G02C 7/12; G02C 7/10
(52) U.S. Cl. ........................... 351/163; 351/44; 351/165
(58) Field of Search ................................... 351/163, 164, 351/165, 166, 44

(56) References Cited

U.S. PATENT DOCUMENTS

| 3,617,114 | 11/1971 | Rogers . |
| 5,757,459 | * 5/1998 | Bhalakia et al. ..................... 351/164 |
| 6,145,984 | * 11/2000 | Farwig ................................... 351/49 |

FOREIGN PATENT DOCUMENTS

| 88/08430 | 11/1988 | (WO) . |
| 91/07674 | 5/1991 | (WO) . |
| 98/27452 | 6/1998 | (WO) . |

* cited by examiner

Primary Examiner—Scott J. Sugarman
(74) Attorney, Agent, or Firm—Arent Fox Kintner Plotkin & Kahn, PLLC

(57) ABSTRACT

Composite glass (2) for protecting the eyesight comprising, starting from the inside, from the eye side (1), towards the outside a first optically polished mineral glass (3), a polarizing film (4) having two sides, a second optically polished mineral glass (5), the polarizing film being glued with its first side onto the first glass and with its second side onto the second glass, characterized in that the first glass being approximately 1 mm thick is a high-pass filter, the cut-off wavelength of which is approximately 480 nm and having a yellow base, the polarizing film is oriented so as to attenuate the light rays reflected by the ground and sent back upwards, the second glass is colorless, and in that the first glass comprises at the surface, on the eye side, a light absorbing surface deposit (7) making a film. A stepped down median specular strip (9) may be deposited on the outer surface of the composite glass.

10 Claims, 2 Drawing Sheets

FIG_1
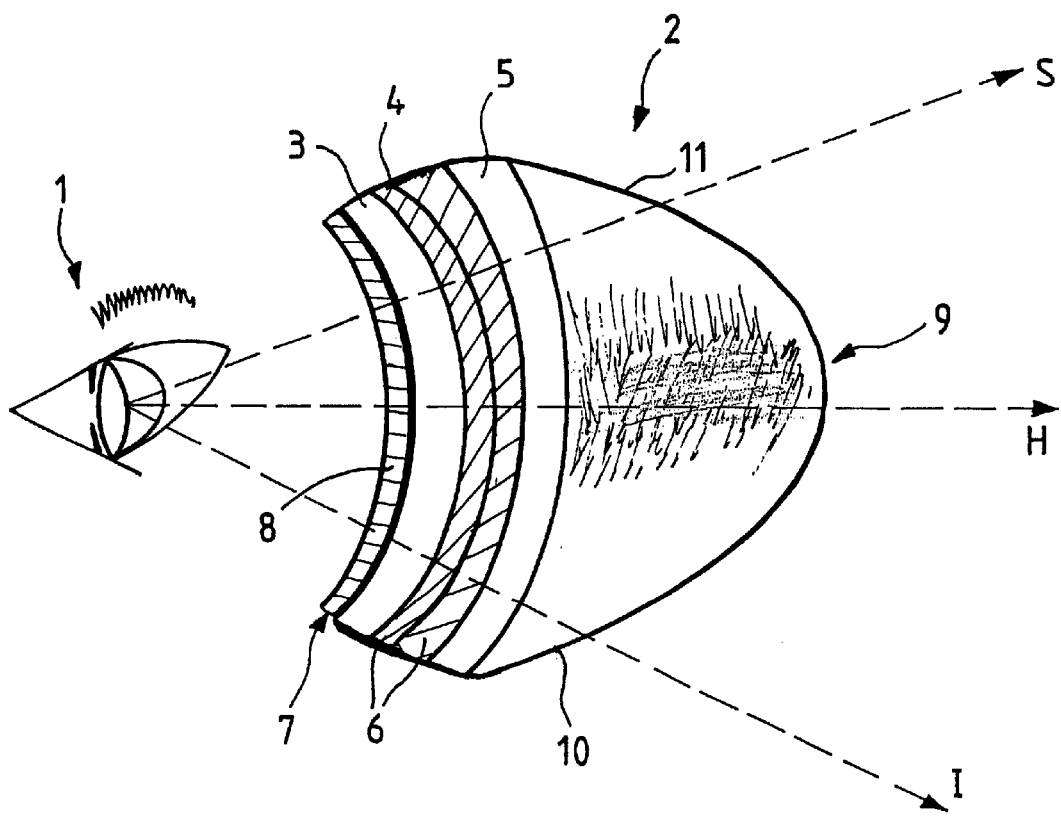

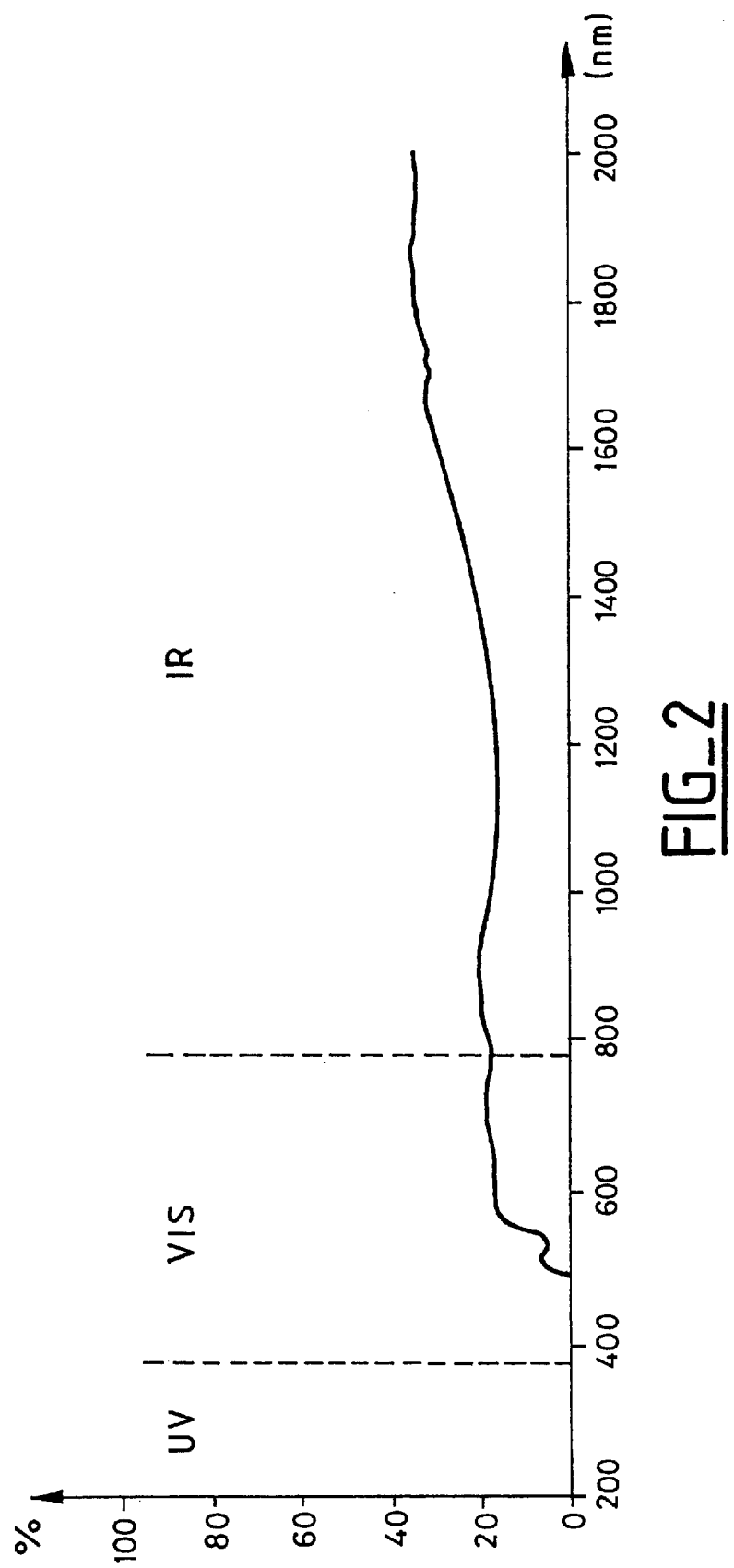
FIG_2

EYESIGHT PROTECTIVE COMPOSITE GLASS

FIELD OF THE INVENTION

This invention relates to a composite glass for protecting the eyesight. It has applications in the optical field adapted to the human or animal eyesight.

BACKGROUND OF THE INVENTION

The eyesight protective glasses against the harmful effects of sunbeams are known. In its simplest form, a glass is made of a glass lamella usually bent in two perpendicular directions and of a substantially constant thickness in the case of a non corrective glass. The material used for producing the lamella may be mass tinted or an absorbing and/or reflecting layer can be arranged superficially in order to obtain a filtering effect for the light rays. Various improvements are also known. It is thus possible to arrange a layer of an anti-reflecting material at the surface of the lamella. Similarly, it is also possible to combine a polarizing film to the glass so as to attenuate polarized light rays in a determined direction and more particularly as a result of a reflection from a surface, usually the ground, covered with snow or water. However, as the polarizing film is made in a plastic material and is relatively breakable, it is glued in sandwich between two glass lamellae.

The resulting structures are therefore made of materials having different filtering and appearance spectral features and the global effect on all the light rays is not always optimal. In particular, it seems difficult to obtain a structure that would be both appropriate to filter the day-time sun light beams which have a broad spectrum and the night-time artificial light sources which vary considerably. The light sources that can be encountered at night are, in the eye sensitivity area, generally monochromatic or comprise few emission lines. This is specially the case for electrical gas discharge light sources that are used for public lighting. Moreover, the automotive lighting, beside broader spectrum incandescence sources, also begins to use discharge lamps that seem to be more aggressive visually. In all cases, the artificial light sources that are most frequently encountered at night have a spectrum that is relatively remote from the sun spectrum.

SUMMARY OF THE INVENTION

The aim of the present invention is therefore to provide a protective glass structure that would be optimised for both day-time and night-time use conditions. To this end, the invention provides a composite glass for protecting the eyesight comprising, in use, an upper part at the top and a lower part at the bottom and towards the ground, said composite glass comprising starting from the inside, from the eye side, towards the outside a first optically polished mineral glass, a polarizing film having two sides, a second optically polished mineral glass, the polarizing film being glued with its first side onto the first glass and with its second side onto the second glass.

According to the invention:

the first glass being approximately 1 mm thick is a high-pass filter, the cut-off wavelength of which is approximately 480 nm and having a yellow base, the polarizing film is oriented so as to attenuate the light rays reflected by the ground and sent back upwards, the second glass is colorless, and the first glass comprises at the surface, on the eye side, a light absorbing surface deposit making a film.

In various embodiments of the invention, the following means used alone or with all the technically possible combinations thereof are carried out:

the absorbing surface deposit is a high-pass filter, the absorbing surface deposit is an attenuating all-pass filter, the absorbing surface deposit is obtained through high vacuum evaporation of at least a dielectric-metal pair, the dielectric is selected amongst oxides such as silicon or titanium oxides, the first glass comprises moreover on the eye side at the surface of the absorbing surface deposit, an anti-reflecting material layer, the anti-reflection material layer is obtained through high vacuum evaporation of a low refractive index product and which does not absorb the light rays for the visible spectrum, the thickness of the anti-reflection material layer is in accordance with the light wavelengths reaching the eye, the layer thickness is preferably equal to approximately ¼ of the average wavelength of the light waves of the visible spectrum, the anti-reflection material is selected amongst silicon, fluorine or magnesium fluoride monoxides or dioxides, the second glass comprises moreover on its outer surface a specular strip stepping down towards the upper part and towards the lower part, the reflection coefficient of said strip being minimum upwards and downwards and being maximum between both, the specular strip is obtained through high vacuum deposition of at least one film of a metal, the film thickness is comprised in the range from 1 to 10 nm, the metal is selected amongst metals with a strong glass adherence and a high chemical and mechanical resistance and a high hardness, the metal is selected amongst chromium, silver, gold, silvered chromium, bluish chromium, golden chromium; the bluish chromium corresponds to chromium and to a stepped down anti-reflection silicon monoxyde, the high vacuum approximately corresponds to a pressure of about $5.10^{-9}$ Bar.

The present invention also relates to a pair of glasses comprising at least a composite glass according to any one of the independent or combined preceding features.

The use of a composite glass according to the preceding features allows to eliminate the harmful sunbeams of the ultraviolet and infrared types in the case of day-time sight and improves the evaluation of contrasts in all lighting conditions, either at day or night-time. Such a glass also improves the visual comfort upon night-time driving. In foggy weather conditions, it enhances relieves and field depth.

The embodiment in which the glass comprises a median stepped down specular strip is particularly advantageous for driving engine vehicles of the automotive vehicle or aircraft type. In fact, the most luminous area of the vision field substantially corresponds to the horizontal and the less luminous areas to the upper and lower areas comprising the dash-board or the navigation instruments. Thus, the glass according to the invention allows to attenuate and/or reflect preferably the light rays originating from the most luminous area.

BRIEF DESCRIPTION OF THE DRAWINGS

The present invention will be more fully understood by reading a concrete non limitative embodiment wherein FIG.

1 is a cross-sectional and perspective view of a composite glass according to the invention and FIG. 2 shows the response curve of a composite glass according to the invention.

DETAILED DESCRIPTION OF THE PREFERRED EMBODIMENT

The composite glass 2 in FIG. 1 is concave towards an eye 1. The composite glass 2 is made of a first glass 3 towards the eye 1 and of a second glass 5 opposite the preceding one with respect to the eye 1. A polarizing plastic film 4 is arranged between the first glass 3 and the second glass 5. The film 4 is stuck with its two sides by glue 6 onto the first glass 3 and onto the second glass 5. The composite glass comprises an upper area 11 upwards, a lower area 10 downwards and a median zone corresponding to the maximum reflection area of a substantially horizontal specular strip 9. The eyesight field 1 may correspond to three areas: upper area 11 for S axis, median zone for H axis and lower area 10 for I axis. The polarizing film is so oriented as to preferably block the light rays being reflected by ground or water and that therefore propagate from the bottom to the top substantially parallel to the I axis.

On the eye side 1, at the surface of the first glass 3, an absorbing surface deposit 7 has been performed by vacuum deposit of a dielectricmetal pair film. Silicon or titanium oxides may be used for instance. Other metal oxides may also be used within the scope of the invention. The deposit is performed by evaporation of the pair or the metal in oxidizing conditions in a closed enclosure subjected to a high vacuum of approximately $5.10^{-9}$ Bar. The absorbing surface deposit forms an attenuating all-pass filter or, in the exemplary embodiment, a preferably attenuating high-pass filter in the passband.

An antireflection material layer 8 is arranged at the surface of the absorbing surface deposit 7 on the eye side 1. The antireflection layer 8 is preferably carried out by vacuum deposit of a low refractive index product. The deposit is done due to the evaporation of the product in a closed enclosure subjected to a high vacuum of approximately $5.10^{-9}$ Bar.

In a particular embodiment according to the invention, a specular strip 9 is performed on the outer surface of the composite glass 2 on the opposite side of the eye 1. The specular strip 9 is stepped down in such a way that the reflection of light rays is maximum in the substantially horizontal central band corresponding to a horizontal vision field according to the H axis. The areas above and under the specular strip corresponding to the upper 11 and lower 10 areas have a less and less important reflection progressing with the remoteness in respect to said central band. Such a treatment is particularly advantageous in driving or piloting activities and, more generally, in all the activities wherein a landscape is to be observed according to a horizontal plane and instruments in planes inclined downwards and/or upwards in respect to the horizontal. This is particularly the case in driving automotive vehicles, in piloting aircrafts or any other type of transport means actuated by a human operator.

The first glass 3 is a mass tinted glass so-called yellow glass.

The second glass 5 is, for instance, a colorless glass of the CROWN type with an index of 1.523.

The polarizing film 4 is a plastic film.

The glue 6 may be selected, for example, amongst glues of the LOCITE® or CYANOLIT® type or a mixture of both.

The combination of the features of the first and second glasses, the polarizing film and the surface deposit allows thereby the production of a composite glass thus having improved protective and visual comfort features both for night-time and for day-time artificial lighting.

The response curve of a composite glass according to the invention at the central band level is shown in FIG. 2 wherein the % correspond to the transmission, nm to the wavelength of the light and UV, VIS and IR respectively correspond to ultraviolet, visible and infrared bands.

What is claimed is:

1. A composite glass for protecting the eyesight comprising, in use, an upper part at the top and a lower part at the bottom and towards the ground, said composite glass comprising starting from the inside, from the eye side, towards the outside:

a first optically polished mineral glass, a polarizing film having two sides, a second optically polished mineral glass, the polarizing film being glued with its first side onto the first glass and with its second side onto the second glass wherein:
   the first glass being approximately 1 mm thick is a high-pass filter, the cut-off wavelength of which is approximately 480 nm and having a yellow base,
   the polarizing film is oriented so as to attenuate the light rays reflected by the ground and sent back upwards,
   the second glass is colorless, and the first glass comprises at the surface, on the eye side, a light absorbing surface deposit making a film.

2. A glass according to claim 1, wherein the absorbing surface deposit is a high-pass filter.

3. A glass according to claim 2, wherein the absorbing surface deposit is obtained through high vacuum evaporation of at least one dielectric-metal pair, the dielectric being selected from oxides such as silicon or titanium oxides.

4. A glass according to claim 1, wherein the first glass comprises moreover on the eye side, at the surface of the absorbing surface deposit, an anti-reflection material layer.

5. A glass according to claim 4, wherein the anti-reflection material layer is obtained through high vacuum evaporation of a low refractive index product and which does not absorb the light rays for the visible spectrum, the anti-reflection material being selected amongst silicon, fluorine or magnesium fluoride monoxides or dioxides.

6. A glass according to claim 5, wherein the thickness of the anti-reflection material layer is in accordance with the light wavelengths reaching the eye and is preferably equal to approximately ¼ of the average wavelength of the light waves of the visible spectrum.

7. A glass according to claim 1, wherein the second glass additionally comprises on its outer surface a specular strip stepped down towards the upper part and towards the lower part, the reflection coefficient of said strip being minimum upwards and downwards and being maximum between both.

8. A glass according to claim 7, wherein the specular strip is obtained through high vacuum deposition of at least one metal film, the film thickness being in the range from 1 to 10 nm.

9. A glass according to claim 8, wherein the metal is selected amongst metals having a strong glass adherence and a high chemical and mechanical resistance and a high hardness, the metal being selected amongst chromium, gold, silver, silvered chromium, bluish chromium, golden chromium.

10. A pair of glasses comprising at least one composite glass according to claim 1.

* * * * *